United States Patent
Nishikawa et al.

[11] Patent Number: 5,113,198
[45] Date of Patent: May 12, 1992

[54] METHOD AND APPARATUS FOR IMAGE RECORDING WITH DYE RELEASE NEAR THE ORIFICE AND VIBRATABLE NOZZLES

[75] Inventors: Hisashi Nishikawa; Yasuo Matsumoto; Ayumu Makino, all of Shizuoka, Japan

[73] Assignee: Tokyo Electric Co., Ltd., Tokyo, Japan

[21] Appl. No.: 555,781

[22] Filed: Jul. 23, 1990

Related U.S. Application Data

[63] Continuation-in-part of Ser. No. 40,718, Apr. 20, 1987, abandoned, which is a continuation of Ser. No. 823,745, Jan. 29, 1986, abandoned.

[30] Foreign Application Priority Data

Jan. 30, 1985 [JP] Japan ............ 60-16156

[51] Int. Cl.⁵ ................................. B41J 2/11
[52] U.S. Cl. ............................... 346/1.1; 346/75
[58] Field of Search .......... 346/1.1, 75, 140; 358/75

[56] References Cited

U.S. PATENT DOCUMENTS

| | | | |
|---|---|---|---|
| 1,709,926 | 4/1929 | Weaver | 358/75 |
| 2,278,940 | 4/1942 | Murphy | 358/77 |
| 2,776,182 | 1/1957 | Gunderson . | |
| 3,553,371 | 1/1971 | Suenaga | 358/77 |
| 3,578,897 | 5/1971 | Stock . | |
| 3,763,308 | 10/1973 | Miyata | 358/75 |
| 3,950,967 | 4/1976 | Davies | 68/5 D |
| 4,296,317 | 10/1981 | Kraus . | |

FOREIGN PATENT DOCUMENTS

| | | |
|---|---|---|
| 190045 | 8/1986 | European Pat. Off. . |
| 71636 | 6/1979 | Japan . |
| 71637 | 6/1979 | Japan . |
| 57-1771 | 1/1982 | Japan . |
| 5922759 | 2/1982 | Japan . |
| 181690 | 8/1986 | Japan . |

OTHER PUBLICATIONS

Patent Abstracts of Japan vol. 6, no. 58 (M-122) [936], Apr. 15, 1982 and JP-A-57 1771 (Cannon K.K.) Jun. 1, 1982.

*Primary Examiner*—Joseph W. Hartary
*Attorney, Agent, or Firm*—Oblon, Spivak, McClelland, Maier & Neustadt

[57] ABSTRACT

An image recording method and apparatus including jetting a single carrier gas stream from a nozzle toward an oppositely disposed recording member, causing vaporous dyes formed by heating sublimable dyes to be blown out according to a picture signal into the carrier gas stream, and attaching the vaporous dyes carried on the carrier gas stream onto the recording member. The dyes enter the gas stream immediately adjacent the orifice of the nozzle. In a second embodiment, the plurality of nozzles, each carrying only one color, are vibratable to mix the colors.

9 Claims, 5 Drawing Sheets

METHOD AND APPARATUS FOR IMAGE RECORDING WITH DYE RELEASE NEAR THE ORIFICE AND VIBRATABLE NOZZLES

This application is a continuation-in-part of application Ser. No. 07/040,718, filed on Apr. 20, 1987, now abandoned, which is a continuation of application Ser. No. 06/823,745, filed on Jan. 29, 1986, now abandoned.

FIELD OF THE INVENTION AND RELATED ART STATEMENT

As conventional methods for color image recording making use of sublimable dyes, namely, methods for color recording by mixing two or more kinds of coloring dyes in the form of vapor and causing the mixed vaporous dyes to be blown out and attached on to a recording member, there are such as disclosed in Japanese Patent Laid-open Nos. 57-1771 and 59-22759.

The former method comprises the steps of heating dyes of a plurality of colors in their respective chambers to form dye vapor therefrom and collecting these various colors of dye vapor into a stream blowing out from a single nozzle. This method is indicated in FIG. 9 and therein is used sublimable color ink. That is, four colors, yellow, magenta, cyan, and black, of dye ink are each supplied by pressure means 1 through a conducting tube 2 into an ink jet nozzle 3, where the dye ink is heated by heating means 4 formed of nichrome wire or the like and sublimed into dye vapor. Each of the vaporous dyes is excited to oscillate by means of an electromechanical transducing bar 5 thereby to be ejected from a single orifice 6 toward a recording member 8, in the form of ink-gas particles 7. At this time, the heat for each color of the dye ink and hence its sublimed amount is controlled by a heating signal generating device and the color conditioning is achieved by mixing the vaporous dyes.

In the latter of the above mentioned methods, disclosed in Japanese Patent Laid-open No. 59-22759, there is provided a nozzle 10 including three sublimable-dye sticks 11, a laser beam source 12, and an air system 13 within the same. A lens 14 is driven so that the laser beam from the laser beam source 12 is condensed and irradiated on a desired sublimable-dye stick to produce dye vapor therefrom. The produced dye vapor is caused to be blown out from the tip of the nozzle 10 by means of compressed air from the air system 13 and attached on to a recording paper 15.

Now, difficulties with these prior art methods will be described. In the former case disclosed in Japanese Patent Laid-open No. 57-1717, indicated in FIG. 9, portion of the sublimed dye vapor remains in its passage whereby color signal and picture signal are not reproduced accurately. More specifically, since it lacks effective means to eject the dye vapor from the nozzle, the dye vapor tends to remain in the nozzle. And this remaining dye vapor in the nozzle is mixed and blown out together with the dye vapor produced in response to the next heating signal. Thus, the remaining dye vapor in the nozzle causes deterioration in the color reproducibility.

In the latter case disclosed in Japanese Patent Laid-open No. 59-22759, indicated in FIG. 10, since there is provided an optical system, the apparatus becomes costly, and since the lens and laser beam source are required for a single nozzle and the dye sticks are to be incorporated into the nozzle from the circumference thereof, it is difficult to provide a multi-head structure.

OBJECT AND SUMMARY OF THE INVENTION

A primary object of the present invention is to provide an image recording method and apparatus to be arranged in a simple structure and enabled to make image recording with good reproducibility.

To achieve the above object, the present invention comprises the steps of heating a sublimable dye to be sublimed into dye vapor and causing the same to be blown out according to a picture signal toward a carrier gas stream jetted from a nozzle, and allowing the dye vapor carried on the carrier gas stream to be sprayed to a recording member disposed opposite to the nozzle and attached to the recording member to form a picture image thereon. Therefore, the dye vapor is fast ejected from the nozzle by means of the carrier gas stream in making the record and there remains no amount of the dye vapor in the nozzle. Thus, in color recording, reproduction of color images with fidelity to color signal and picture signal can be achieved. Since, for the same reason, no other ejecting or controlling means is required to be provided outside the nozzle, the apparatus can be miniaturized and simplified in structure and arrangement close to the recording member is made possible, and thus, recording with high resolution is made achievable.

DETAILED DESCRIPTION OF THE PREFERRED EMBODIMENT

Figure 1:
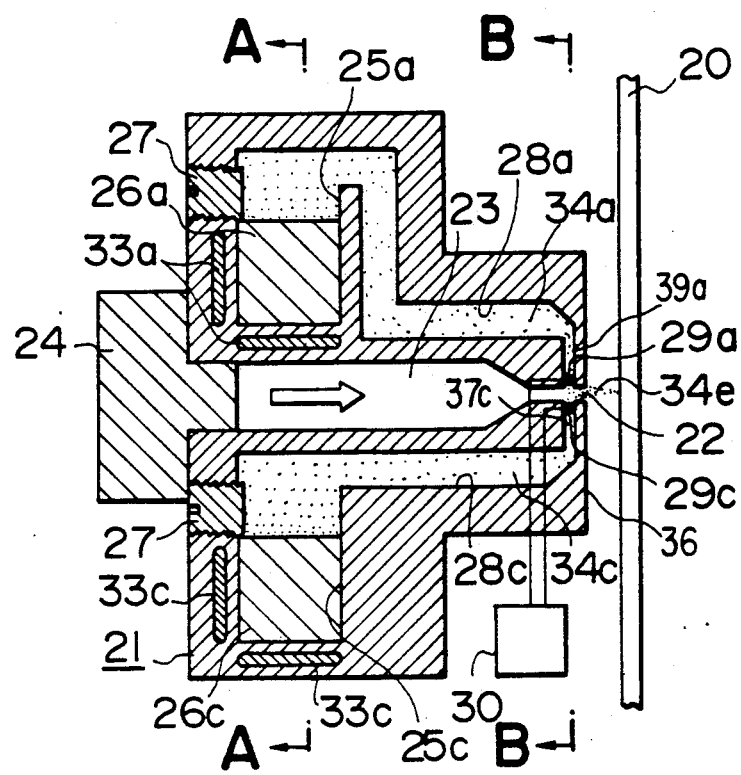
FIG. 1 is a side view in vertical cross-section showing a first preferred embodiment of the invention.
Figure 2:
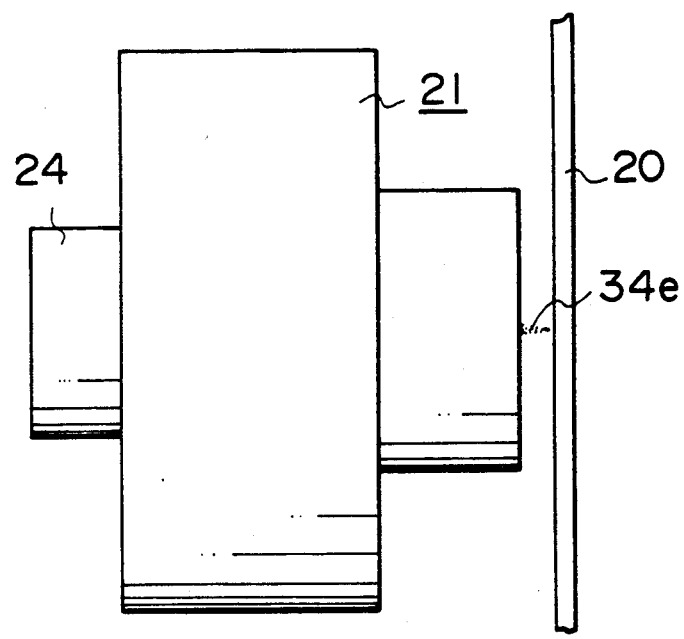
FIG. 2 is a side view showing the external appearance of the same.
Figure 3:
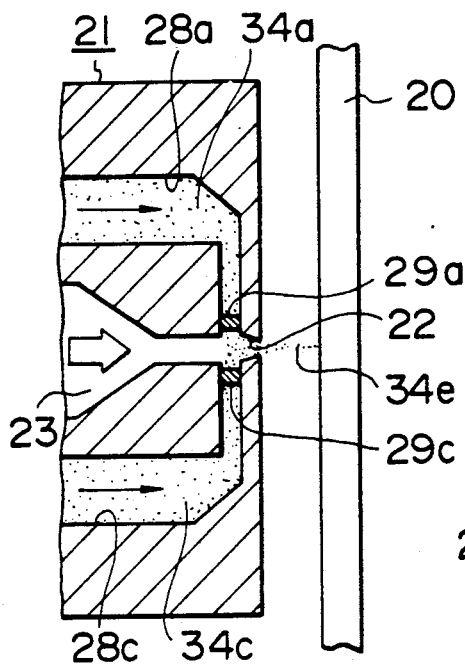
FIG. 3 is an enlarged side view in vertical cross-section of a portion of FIG. 1.
Figure 4:
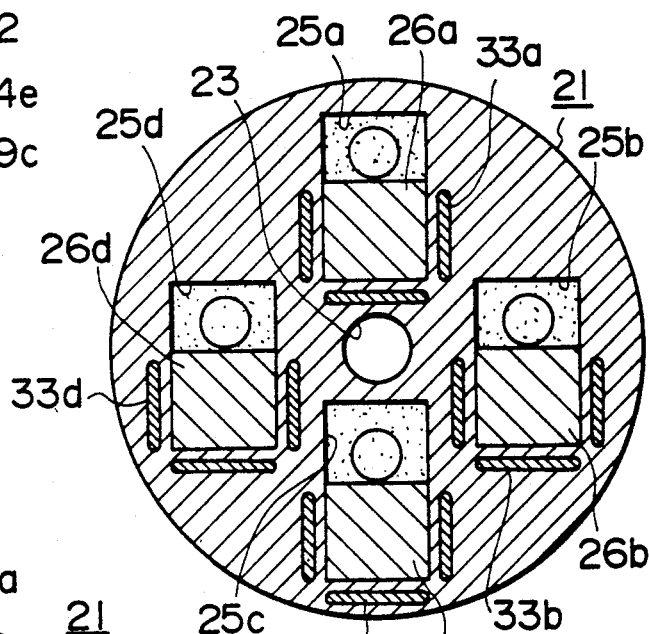
FIG. 4 is a cross-sectional view taken along line A—A of FIG. 1.
Figure 5:
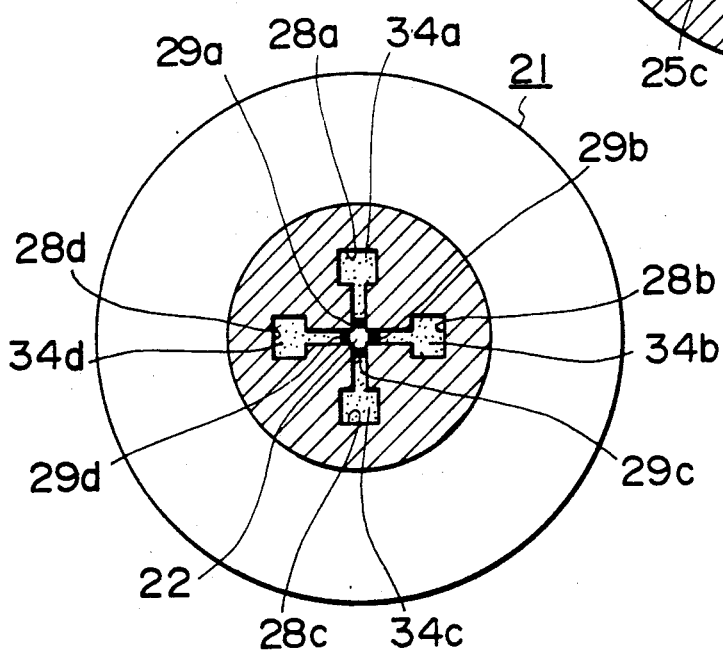
FIG. 5 is a cross-sectional view taken along line B—B of FIG. 1.
Figure 6:
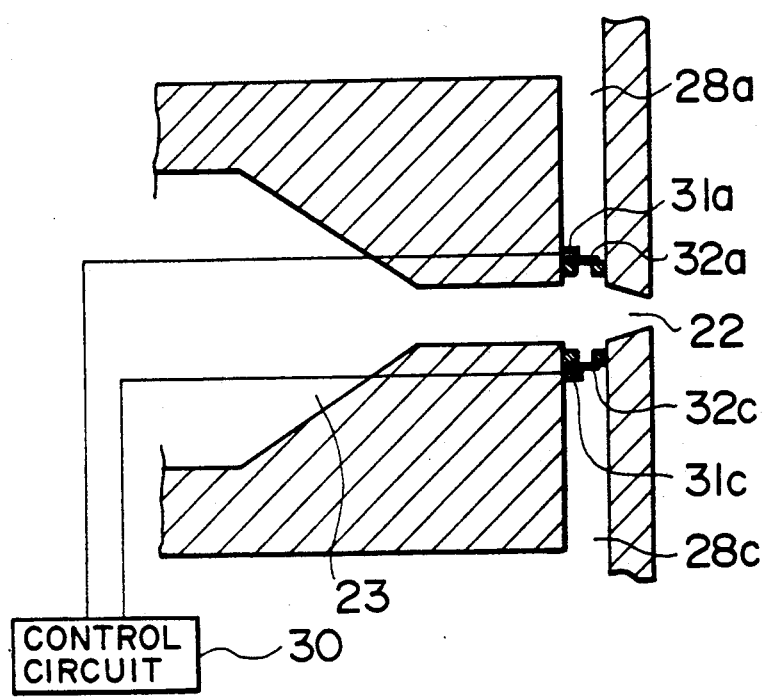
FIG. 6 is an enlarged side view in vertical cross-section of an example of a control device.

A first preferred embodiment of the invention will first be described with reference to FIGS. 1 to 6, in which FIG. 2 is a side view showing an external appearance of a recording head 21 disposed opposite to a recording member 20. There is formed an orifice portion 22 of a small diameter in the center of the end wall portion 36 of the recording head, and in the center within the same is formed an air nozzle 23 which is communicated with the orifice portion 22 and also communicated on its rear side with an air source 24. Separate from the air source, there are disposed two or more dye chambers 25 around the air nozzle 23 in such a manner that they communicate with each other in the vicinity of the orifice portion 22. These dye chambers 25 are adapted to be supplied and set with different colors of sublimable dyes 26 from dye supply portions 27. In the present embodiment, there are provided four dye chambers 25 as denoted by 25a-25d and they are adapted to be set with four kinds of dyes, cyan 26a, magenta 26b, yellow 26c, and black 26d. In the described arrangement, these dye chambers 25 and the orifice portion 22 are communicated via dye vapor passages 28a-28d, and on the end portions thereof on the side of the orifice portion 22, there are disposed mixture control devices 29a-29d, respectively. The dye vapor passages extend from the dye chamber 25 toward the end wall 36 of the recording head 21. Each passage ends with a spout portion 37a-37d which is formed immediately adjacent to and touching the end wall 36. That is, the inner surface of the end wall itself is part of the surface of the spout portion 37a-37d. Thus, the spout is not merely near this wall, but the wall actually forms the spout. The end of each spout includes one of the mixture control devices 29a-29d and delivers the dye into the orifice 22, which is immediately adjacent to and touching the spout portion. Thus the orifice is an opening in the same end wall which forms the surface of the spout so that the two form a continuous passage. These mixture control devices 29a-29d are formed of a shutter or the like of cantilever, surface tension valve, electrostriction or magnetostriction resonator, magnetic fluid, or the like, and controlled by a signal from a control circuit 30 in accordance with a picture signal. FIG. 6 is for showing an electrostriction resonator 31 as an example of the mixture control device 29, in which the electrostriction resonator 31 is connected with a valve 32 for opening and shutting the opening portion of the dye vapor passage 28. By application of an voltage from the control circuit 30 to the electrostriction resonator 31, the electrostriction resonator 31 is caused to oscillate, and by this oscillation, the valve 32 is actuated to open and shut the opening portion of the dye vapor passage 28. In this case, since the subliming temperatures of the sublimable dye 26 is as high as 200°-250° C., the electrostriction resonator 31 is selected from those having high thermostability. The same can be said of a magnetostriction resonator, and one having the Curie point as high as 300° C. is preferred. And there are provided heating devices 33a-33d around the sublimable dyes 26 set in the dye chambers 25 to heat the sublimable dye to sublime the same into dye vapor. Here, as the heating means, any of these methods can be used as heater (heating unit), radiation such as laser beam, high frequency heating, alternating magnetic field, electric current passed through the dye, corpuscular ray, sound wave, and so forth.

In the described structure, the sublimable dye 26a-26d in each of the dye chambers 25a-25d is heated by the heating device 33a-33d to be sublimed into dye vapor 34a-34d, and the dye vapor flows, by its own steam pressure, through the dye vapor passage 28a-28d toward the mixture control device 29a-29d. At this time, the mixture control devices 29a-29d are adapted to control quantities of the vaporous dyes 34 passing therethrough according to respective picture color signals obtained. Specific amounts of the vaporous dyes 34a-34d passing through the mixture control devices 29a-29d are mixed within the orifice portion 22 into mixed dye vapor 34e of specific mixing ratios. At this time, the orifice portion 22 is supplied with air pressure from the air source 24 through the air nozzle 23, and the mixed dye vapor 34e is immediately ejected from the orifice portion 22 carried on the carrier gas stream formed of the gas stream by the pressure air and attached on to the recording member 20 disposed on the opposite side. Thus, a color image is formed on the recording member 20.

According to the present embodiment as described above, since the mixed dye vapor 34e produced within the orifice portion 22 is fast ejected therefrom by the carrier gas stream formed of the pressure air, there remains no dye vapor in the orifice portion 22, and so, the colors can be mixed according to the picture signals obtained each moment and color picture images can be reproduced with fidelity to the color signal and picture signal. High speed recording also becomes possible since the mixed dye vapor 34e is fast ejected by the stream of the carrier gas. Further, as to the structure, there is no need of disposing any ejecting means or controlling means of the dye vapor in front of the orifice portion 22 whereby it is made possible to dispose the orifice portion 22 close to the recording member 20, and so, the diameter of the printed dot can be made substantially the same as that of the orifice portion 22. Thus, if the diameter of the orifice portion 22 is made smaller, the resolution of the printing becomes so much the higher. Further, because ejecting means or the like is not needed to be provided outside the orifice portion 22, the recording head 21 can be miniaturized and hence multi-nozzle arrangement can be readily achieved.

Figure 7:
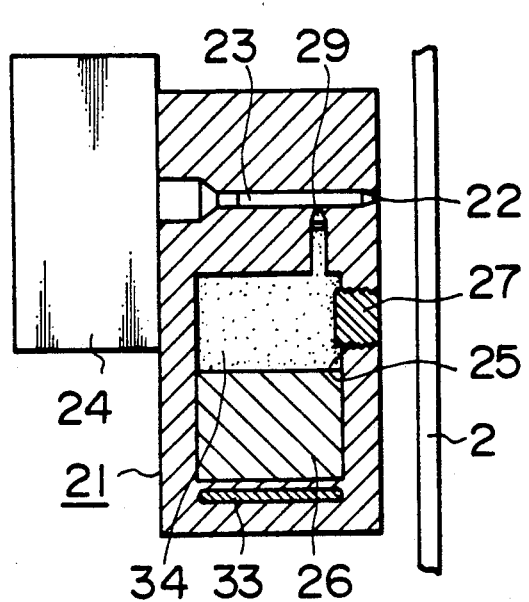
FIG. 7 is a side view in cross-section showing a second preferred embodiment of the invention.
Figure 8:
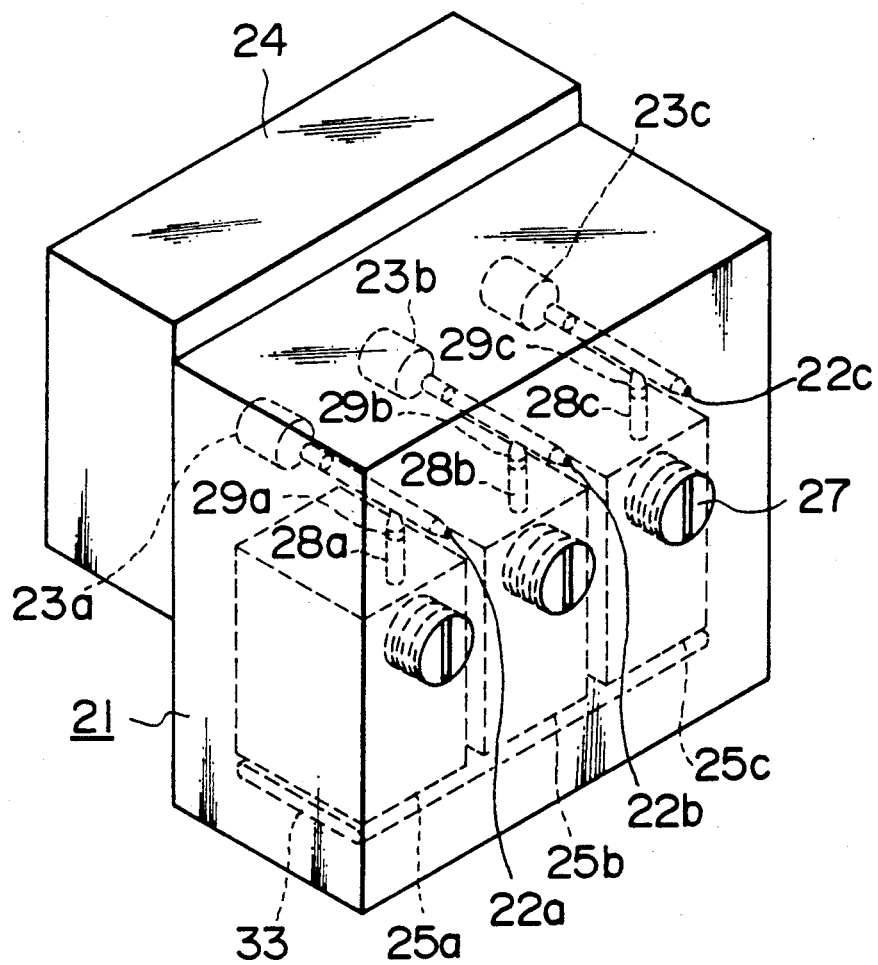
FIG. 8 is a perspective view of the whole body of the same.
Figure 9:
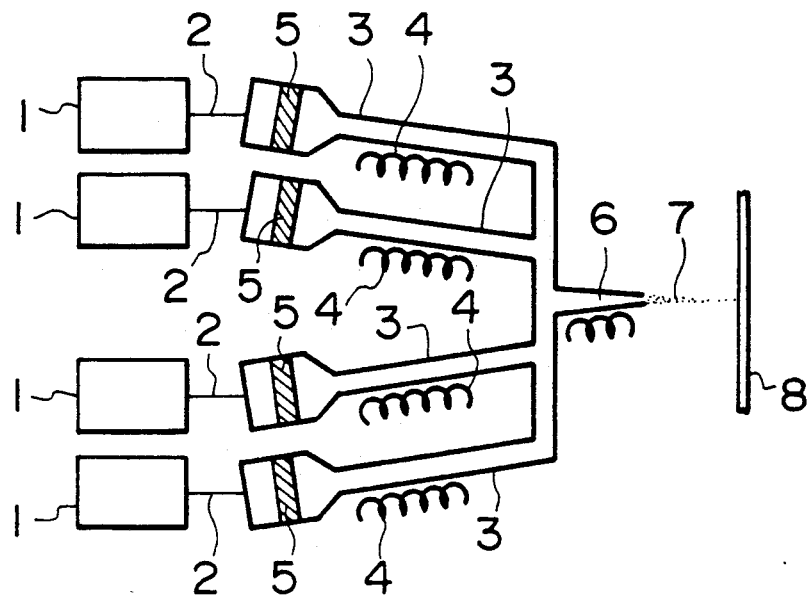
FIG. 9 is an explanatory drawing showing an example of the prior art.
Figure 10:
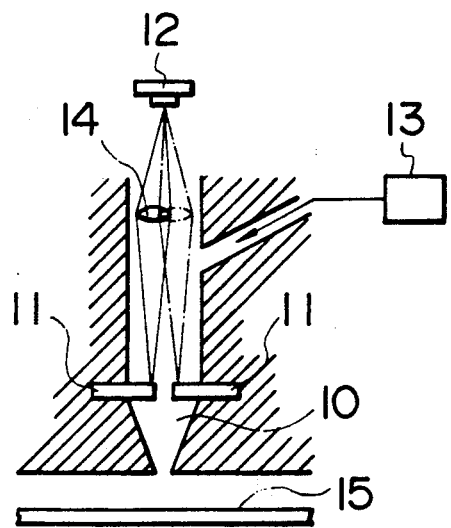
FIG. 10 is a cross-sectional view showing another example of the prior art.

Now, a second preferred embodiment of the invention will be described with reference to FIGS. 7 and 8, in which like or corresponding parts to those indicated in the above described embodiment are denoted by like reference characters. The present embodiment employs three colors, cyan 26a, magenta 26b, and yellow 26c, of sublimable dyes 26, and the dye chambers 25a-25c for the same are disposed in parallel and separated from each other, and, further, these dye chambers 25a-25c are independently provided with air nozzles 23a-23c. And therein it is adapted such that each the vaporous dye 34a-34c supplied from each of the dye chambers 25a-25C through the mixture control device 29a-29c is ejected from the orifice portion 22a-22c by the carrier gas stream from each the air nozzle 23a-23c. While the thus ejected vaporous dyes 34a-34c are attached on to the recording member 20, by giving the recording head 21 a scanning movement, the vaporous dyes 34a-34c are appropriately mixed on the recording member 20 in delayed timing to provide mixed color for making color recording. More specifically, although mixing of the vaporous dyes was carried out within the orifice portion 22 in the previously described embodiment, the color mixing in the present embodiment is perfomed on the recording member 20 after the vaporous dyes have been ejected from the orifice portions 22a-22c.

Although the description of the embodiments in the foregoing has been made as to color recording making use of cyan, magenta, yellow, etc., the same may be similarly applicable to halftone recording by using and controlling the mixing ratio of white and black sublimable dyes.

Since, as described above, the present invention employs the carrier gas stream to eject the dye vapor from the nozzle in making record, the ejection of the dye vapor is fast carried out remaining no dye vapor in the nozzle, and so, at the time of color recording or the like, degradation in the quality of the picture image due to the remaining dye vapor in the previous ejection is eliminated and reproduction of color picture image with fidelity to the color signal and picture signal is thus achieved. Also, in the structure of the apparatus, close access to the recording member can be attained since no provision of ejecting means for the dye vapor is required outside the nozzle, and therefore, recording with high resolution can be made possible, miniaturization of the apparatus is made practicable, and multi-nozzle structure is made readily achievable.

What is claimed is:

1. An image recording method comprising the steps of:
   providing a housing having an end wall near a recording member;
   producing pressurized carrier gas and transporting said carrier gas through a nozzle;
   heating sublimable dyes to produce vaporous dyes;
   transporting said vaporous dyes individually by a dye vapor passage, each dye vapor passage having a spout portion, with a surface of the spout portion being formed by an inner surface of said end wall;
   releasing said vaporous dyes from the spout portion of said dye vapor passages into an orifice portion arranged at the end of said nozzle and extending through said end wall of said housing and touching the spout portions of said dye vapor passages, according to an input signal indicative of a desired pattern;
   blowing said vaporous dyes from said orifice portion onto said recording member by said carrier gas; said vaporous dyes being carried away completely by the carrier gas due to the proximity of the point of release of the dyes to the orifice portion.

2. An image recording method according to claim 1, wherein three colors, cyan, magenta, and yellow, are used as the sublimable dyes.

3. An image recording method according to claim 1, wherein four colors, cyan, magenta, yellow, and black, are used as the sublimable dyes.

4. An image recording method according to claim 7, wherein vaporous dyes produced from plural colors of sublimable dyes are mixed in appropriate mixing ratios.

5. An image recording apparatus comprising:
   a housing having an end wall near a recording member;
   a source of pressurized carrier gas;
   a nozzle associated with said source for transporting said carrier gas;
   an orifice arranged at the end of said nozzle and extending through said end wall of said housing;
   a plurality of sublimable dyes;
   a plurality of heaters for heating said sublimable dyes to form vaporous dyes;
   a plurality of passages each associated with one of said sublimable dyes, each of said passages having a spout portion with a surface of said spout portion being formed by an inner surface of said end wall and said spout portion touching said orifice so that said vaporous dyes are carried into said orifice; and
   means for controlling the release of said vaporous dye into said nozzle so that said vaporous dyes are blown out of said orifice by said carrier gas and onto said recording member due to the proximity of the ends of said passages to the orifice.

6. An image recording apparatus according to claim 5, wherein said passages for carrying said vaporous dye are arranged around said nozzle for transporting said carrier gas.

7. An image recording apparatus according to claim 5 wherein said means for controlling the release of vaporous dye is placed radially around said orifice, whereby the dyes are released into the orifice and immediately blown through the orifice by the carrier gas.

8. An image recording apparatus comprising:
   a housing having an end wall near a recording member;
   a source of pressurized carrier gas;
   a nozzle associated with said source for transporting said carrier gas;
   an orifice arranged at the end of said nozzle and extending through said end wall of said housing;
   a plurality of sublimable dyes;
   a plurality of heaters for heating said sublimable dyes to form vaporous dyes;
   a plurality of passages each associated with one of said sublimable dyes, each of said passages having a spout portion with a surface of said spout portion being formed by an inner surface of said end wall and said spout portion touching said orifice so that said vaporous dyes are carried into said orifice;
   a gate means located at the end portion of each said spout portions; and
   a means for controlling the opening and shutting of the gates so that said vaporous dyes are blown out of said orifice by said carrier gas and onto said recording member.

9. An image recording apparatus according to claim 8, wherein said passages for carrying said vaporous dye are arranged around said nozzle for transporting said carrier gas.

* * * * *